United States Patent
McKeen et al.

(10) Patent No.: US 7,259,712 B1
(45) Date of Patent: Aug. 21, 2007

(54) ANTENNA WITH INTEGRAL SEALING MEMBER FOR A RADAR-BASED LEVEL MEASUREMENT SYSTEM

(75) Inventors: John McKeen, Bridgenorth (CA); Gabriel M. Serban, North York (CA)

(73) Assignee: Siemens Milltronics Process Instruments Inc., Peterborough, Ontario (CA)

( * ) Notice: Subject to any disclaimer, the term of this patent is extended or adjusted under 35 U.S.C. 154(b) by 90 days.

(21) Appl. No.: 10/956,959

(22) Filed: Sep. 30, 2004

(51) Int. Cl.
*G01S 13/08* (2006.01)
*G01F 23/284* (2006.01)

(52) U.S. Cl. .................. 342/124; 324/644; 342/175
(58) Field of Classification Search ............. 342/124
See application file for complete search history.

(56) References Cited

U.S. PATENT DOCUMENTS

| | | | |
|---|---|---|---|
| 4,670,754 A * | 6/1987 | Zacchio ............... | 342/124 |
| 5,305,237 A * | 4/1994 | Dalrymple et al. ..... | 702/55 |
| 5,507,181 A * | 4/1996 | Fox et al. ............ | 73/290 V |
| 5,872,494 A * | 2/1999 | Palan et al. .......... | 333/252 |
| 6,107,957 A * | 8/2000 | Cramer et al. ........ | 342/124 |
| 6,300,897 B1 * | 10/2001 | Kielb ................. | 342/124 |
| 6,337,655 B1 * | 1/2002 | Wilkie et al. ......... | 342/124 |
| 6,859,166 B2 * | 2/2005 | Edvardsson ........... | 342/124 |
| 2003/0168674 A1 * | 9/2003 | Muller et al. ........ | 257/200 |
| 2003/0169197 A1 * | 9/2003 | McGregor ............ | 342/124 |
| 2004/0113853 A1 * | 6/2004 | Serban et al. ........ | 343/703 |
| 2005/0017896 A1 * | 1/2005 | Klofer et al. ........ | 342/124 |
| 2005/0083229 A1 * | 4/2005 | Edvardsson et al. ... | 342/124 |
| 2005/0225480 A1 * | 10/2005 | Fehrenbach et al. ... | 342/124 |

\* cited by examiner

*Primary Examiner*—Thomas H. Tarcza
*Assistant Examiner*—Matthew M. Barker
(74) *Attorney, Agent, or Firm*—Townsend and Townsend and Crew LLP

(57) ABSTRACT

An antenna assembly suitable for use with a microwave-based level measurement system mounted on a vessel. The antenna assembly comprises a rod antenna having a mounting member with an integral sealing ring. The antenna is molded from a conductive polymer such as PTFE. The sealing ring is also formed from the same polymer as the antenna. The sealing ring may be formed as an integral component of the mounting member molded from a polymer material or as a separate ring element which is welded or otherwise affixed to the mounting member. The antenna assembly is coupled to the level measurement apparatus using a clamping mechanism. As the clamping mechanism is secured to the mounting member, the sealing ring is compressed and deflected and in the compressed state provides a seal between the level measurement apparatus and the section of antenna extending into the vessel. According to another embodiment, the antenna assembly is adapted for and mounted in a horn antenna. The horn antenna is coupled to the level measurement system and extends into the vessel.

13 Claims, 3 Drawing Sheets

ANTENNA WITH INTEGRAL SEALING MEMBER FOR A RADAR-BASED LEVEL MEASUREMENT SYSTEM

FIELD OF THE INVENTION

The present invention relates radar-based level measurement systems, and more particularly to an antenna configuration with an integral sealing member suitable for rod antenna and horn antenna applications.

BACKGROUND OF THE INVENTION

Time of flight ranging systems are commonly used in level measurements applications, and referred to as level measurement systems. Level measurement systems are used to determine the distance to a reflective surface (i.e. reflector) by measuring how long after transmission of a burst of energy pulses, an echo is received. Such systems may utilize ultrasonic pulses, pulse radar signals, or microwave energy signals.

Pulse radar and microwave-based level measurement systems are typically preferred in applications where the atmosphere in the container or vessel is subject to large temperature changes, high humidity, dust and other types of conditions which can affect propagation. To provide a sufficient receive response, a high gain antenna is typically used. High gain usually translates into a large antenna size.

Two types of antenna designs are typically found in microwave-based level measurement systems: rod antennas and horn antennas. Rod antennas have a narrow and elongated configuration and are suitable for containers having small opening/flange sizes and sufficient height for accommodating the antenna. Horn antennas, on the other hand, are wider and shorter than rod antennas. Horn antennas are typically used in installations with space limitations, for example, vessels or containers which are shallow.

The level measurement instrument or device comprises a housing and a waveguide (i.e. the antenna). The level measurement instrument is mounted on top of a container or vessel and the antenna extends into the vessel. The level measurement instrument is typically bolted to a flange around the opening of the container. The housing holds the electronic circuitry. The antenna is coupled to the housing and extends into the interior of the vessel. The antenna operates as a transducer and is excited by the circuit to transmit electromagnetic energy pulses into the vessel, and receives the pulses that are reflected by the surface of the material contained in the vessel. To provide a good seal between the antenna and the flange opening O-rings and gaskets are employed. Typically, antenna configurations utilize o-rings or gaskets internally in their assemblies to provide an antenna/vessel mounting configuration that is liquid and/or gas tight.

It will be appreciated that the inclusion of o-rings or gaskets adds to the installation procedure. These components also represent a potential failure point if not periodically inspected and replaced as needed. For o-rings made of rubber there are additional considerations. First, the rubber o-ring becomes brittle at low temperatures and operation at low temperatures can accelerate degradation and subsequent need for replacement. Secondly, the rubber o-ring introduces another material type into the waveguide guide. Rubber as compared to the waveguide is not very conductive of microwave energy waves or pulses and as result can affect the performance of the waveguide.

Accordingly, there remains a need for an antenna configuration for microwave-based level measurement systems which addresses these deficiencies.

BRIEF SUMMARY OF THE INVENTION

The present invention provides an antenna configuration suitable for use in microwave-based or pulse radar level measurement devices and time of flight ranging systems. According to one aspect, the present invention provides a rod antenna having an integrated sealing member. In another aspect, the present invention provides an antenna arrangement for a horn antenna.

The sealing member is formed from the same material as the antenna and in one aspect as an integrated part of the antenna.

In a first aspect, the present invention provides a level measurement apparatus comprising: a transducer for emitting electromagnetic energy and coupling reflected electromagnetic energy; a controller having a receiver module and a transmitter module; the transducer includes an input port operatively coupled to the transmitter module and is responsive to the transmitter module for emitting the electromagnetic energy, and the transducer includes an output port operatively coupled to the receiver module for outputting reflected electromagnetic energy coupled by the transducer; the receiver module converts the reflected electromagnetic energy into corresponding electrical signals, and the controller includes a program component for determining the distance travelled by the electromagnetic energy; and the transducer includes an antenna assembly, the antenna assembly has an upper section, the upper section is formed from a material for conducting the electromagnetic energy, the upper section includes a mounting member for coupling the antenna assembly to the level measurement apparatus, the mounting member includes a sealing ring, the sealing ring is formed from the material for conducting the electromagnetic energy, the antenna is responsive to the level measurement apparatus for emitting electromagnetic energy pulses and receiving electromagnetic energy pulses reflected by a material held in a container.

In a second aspect, the present invention provides a radar-based level measurement apparatus for determining the level of a material contained in a container, the apparatus comprises: transducer means for emitting radar pulses and coupling radar pulses reflected from the surface of the material; controller means including means for receiving and means for transmitting; the transducer means having an input port operatively coupled to the means for transmitting and being responsive to means for transmitting for emitting the radar pulses, and the transducer means including an output port operatively coupled to the means for receiving for outputting the reflected radar pulses coupled by the transducer means; the means for receiving converting the reflected radar pulses into corresponding electrical signals, and the controller means including means for determining the distance traveled by the radar pulses; and the transducer means including an antenna structure having an upper portion, and the upper portion including mounting means for mounting the antenna structure to the level measurement apparatus, the mounting means includes a sealing means, the sealing means and the upper portion are formed from material for conducting the electromagnetic energy, the antenna is operatively coupled to the level measurement apparatus to emit electromagnetic energy pulses and to receive electromagnetic energy pulses reflected by the material held in the container.

In another aspect, the present invention provides an antenna structure for use with level measurement apparatus for measuring the level of a material held in a container, the antenna structure comprises: an upper section formed from a material having properties for conducting energy pulses, the upper section is coupled to the level measurement apparatus, and the upper section includes a sealing ring, the sealing ring is formed from the same material as the upper section; a lower section formed from the same material, and having an integral antenna, the antenna is responsive to the level measurement apparatus for emitting electromagnetic energy pulses and receiving electromagnetic energy pulses reflected by the material held in the container.

In yet another aspect, the present invention provides a horn antenna assembly for a level measurement apparatus for measuring the level of a material held in a container, the horn antenna assembly comprises: a horn antenna; an antenna structure coupled to the horn antenna; the antenna structure has an upper section formed from a material having properties for conducting energy pulses, and the upper section includes a sealing ring, the sealing ring is formed from the same material as the upper section; the antenna structure has a lower section formed from the same material, the antenna structure and the horn antenna are responsive to the level measurement apparatus for emitting electromagnetic energy pulses and receiving electromagnetic energy pulses reflected by the material held in the container.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference is next made to the accompanying drawings which show, by way of example, embodiments of the present invention and in which.

DETAILED DESCRIPTION OF EMBODIMENTS OF THE INVENTION

Figure 1:
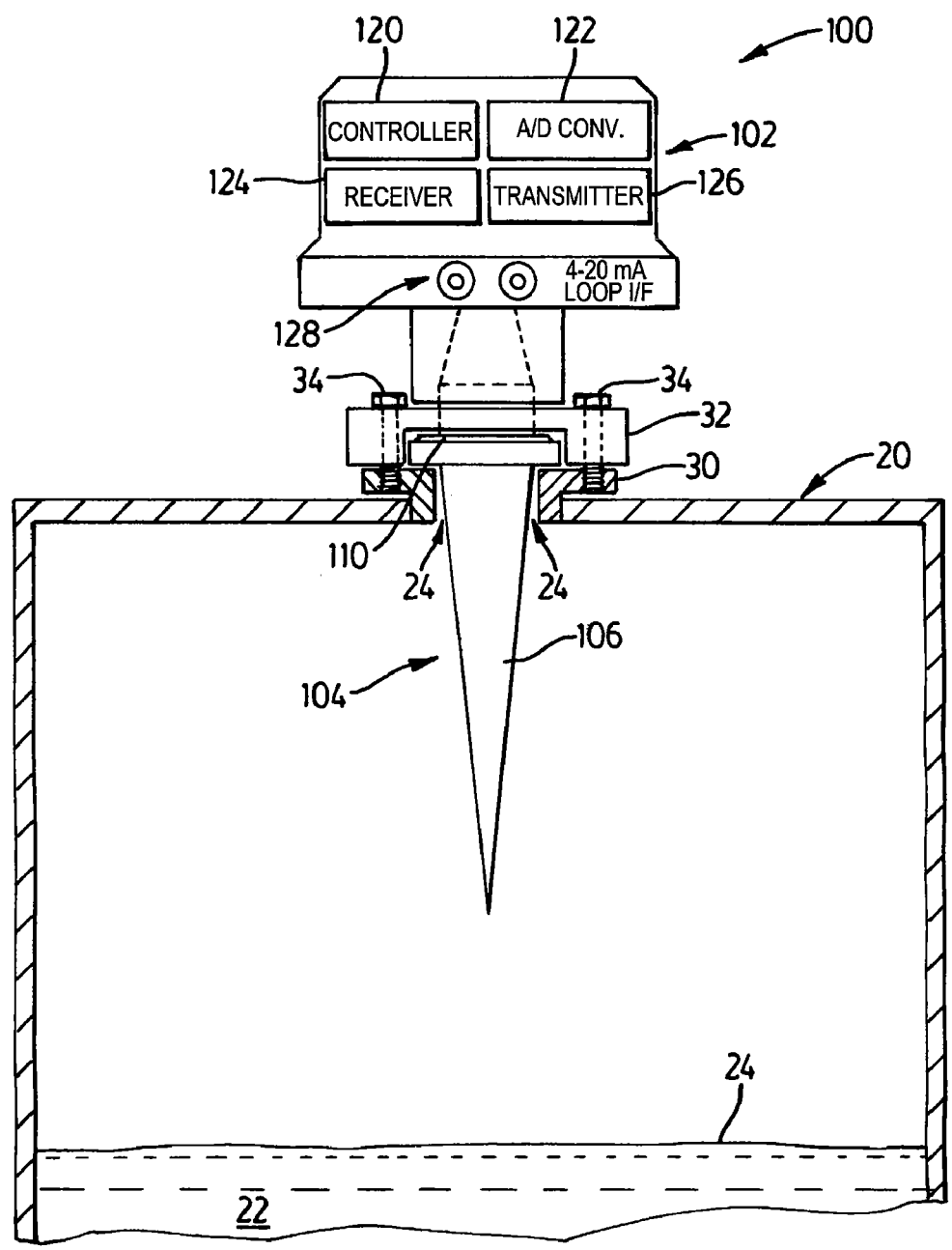
FIG. 1 shows in diagrammatic form a radar-based level measurement system with an antenna structure according to the present invention.

Reference is first made to FIG. 1 which shows in diagrammatic form a radar-based or a microwave-based level measurement apparatus 100 with an antenna assembly or structure in accordance with the present invention.

As shown in FIG. 1, the level measurement apparatus 100 is mounted on top of a container or vessel 20 which holds a material 22, e.g. liquid, slurry or solid. The level measurement apparatus 100 functions to determine the level of the material 22 held in the vessel 20. The vessel or container 20 has an opening 24 with a flange 30. The level measurement apparatus 100 is coupled to the opening 24 using suitable fasteners as will be familiar to those skilled in the art. The level measurement apparatus 100 comprises a housing or enclosure 102 and a transducer 104. The housing 100 holds electrical/electronic circuitry as described below. The transducer 104 extends into the interior of the vessel 20 and comprises an antenna or waveguide assembly 106 in accordance with the present invention. As will be described in more detail below, the antenna or waveguide assembly 106 comprises a rod antenna structure according to one embodiment and a horn antenna structure (FIG. 4) according to another embodiment. As will also be described in more detail below, the antenna assembly 106 includes an integrated sealing ring or member, indicated generally by reference 110 in FIG. 1.

The level measurement apparatus includes a controller 120 (for example a microcontroller or microprocessor), an analog-to-digital converter 122, a receiver module 124 and a transmitter module 126. The level measurement apparatus 100 may also include a current loop interface (4–20 mA) indicated by reference 128. The transducer 104 is coupled to the controller 120 through the transmitter module 126 and the receiver module 124. The controller 120 uses the transmitter module 126 to excite the transducer 104 to emit electromagnetic energy in the form of radar pulses or microwaves. The reflected electromagnetic energy, i.e. reflected radar pulses, are coupled by the transducer 104 and converted into electrical signals by the receiver module 124.

The level measurement apparatus 100 is installed in the container 20, for example a tank, containing the material 22, such as a liquid, with a level determined by the top surface of the material 22. The top surface of the material 22 provides a reflective surface or reflector, indicated by reference 24, which reflects the radar pulses generated from the emitter on the transducer 104, i.e. the antenna assembly 106. The reflected radar pulse is coupled by the transducer 1044 and converted by the receiver 124 into electrical signals. The received electrical signals are sampled and digitized by the A/D converter 122 for further processing by the controller 120. The controller 120 executes an algorithm which identifies and verifies the received signals and calculates the range of the reflective surface 24, i.e. the time it takes for the reflected pulse to travel from the reflective surface 24 to the receiver 124 on the transducer 104. From this calculation, the distance to the surface of the material 22 and thereby the level of the material, e.g. liquid 22 in the vessel 20, is determined. The controller 120 also controls the transmission of data and control signals through the current loop interface 128. The controller 120 is suitably programmed to perform these operations as be within the understanding of those skilled in the art. These techniques are described in prior patents of which U.S. Pat. No. 4,831,565 and U.S. Pat. No. 5,267,219 are exemplary.

Referring to FIG. 1, the antenna assembly 106 comprises a rod antenna structure, and as shown, extends from the opening 24 into the interior of the vessel 20. The antenna assembly 106 is secured to a flange 30 surrounding the opening 24 on the vessel 20, for example, using a clamping or mounting ring 32. The clamping ring 32 fits over the antenna assembly 106 and is secured to the flange 30 using bolts 34 which screw into respective tapped holes 36 in the flange 30. As will be described in more detail, tightening of the bolts 34 causes the clamping ring 32 to compress the sealing ring 110 and provide an effective dust and water seal between the level measurement apparatus 100 and the interior of the vessel 20.

The antenna assembly 106 will typically include an appropriate internal metallic structure (not shown) for functioning as a waveguide in conjunction with the transmitter 126 and receiver 124 modules. The antenna assembly 106 transmits electromagnetic signals onto the surface 24 of the material 22 in the vessel 20. The electromagnetic signal is reflected by the surface 24 of the material 22, and an echo signal is received by the antenna assembly 106. The echo signal is processed using known techniques, for example, as described above, to calculate the level of the material 22 in the vessel 20.

Figure 2:
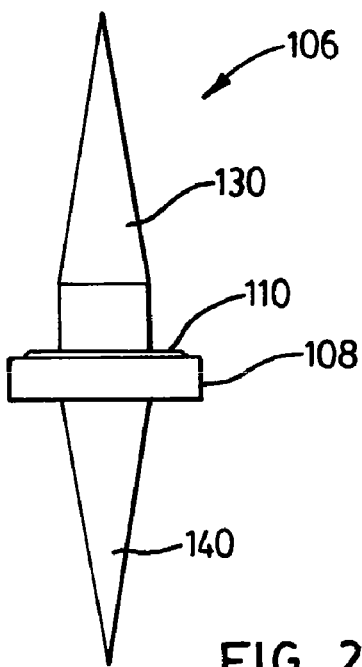
FIG. 2 shows an antenna structure with integrated sealing ring according to the present invention.

Reference is next made to FIG. 2, which shows in more detail the antenna assembly 106 according to the present invention. The antenna assembly 106 comprises an upper section 130 and a lower section 140. The upper section 130 is coupled to the housing 102 and operatively coupled to a transducer interface in the level measurement apparatus 102. The lower section 140 comprises an antenna which launches the microwave energy waves or pulses into the vessel 20 and receives the reflected pulses. As shown, the antenna assembly 106 includes a middle section 108 which rests or is seated on the flange 30 (FIG. 1) on the opening 24 of the vessel 20.

Figure 3A:
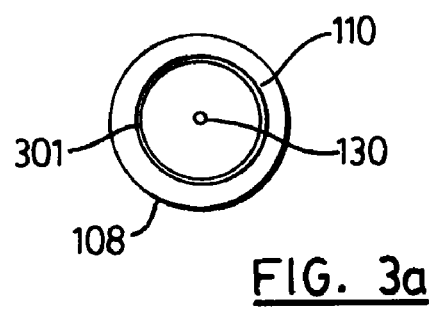
FIG. 3(a) shows a top view of the antenna structure with the integrated sealing ring.

As shown in FIGS. 1, 2 and 3, the antenna 106 includes the sealing ring 110. According to this aspect of the invention, the sealing ring 110 is comprises an integral component on the middle section 108. The antenna assembly 106 is formed of a dielectric material such as PolyTetra Fluoro-Ethylene, or PTFE for short, which is suitable for conducting microwave or radar energy pulses. In one embodiment, the sealing ring 110 is formed as an integral or unitary component of the antenna assembly 106, for example, the sealing ring 110 is molded or fabricated as part of the antenna assembly 106. In another embodiment, the sealing ring 110 is formed from the same material, e.g. PTFE, as the antenna assembly 106 and then welded, glued or otherwise affixed to the middle section 108 of the antenna assembly 106.

The sealing ring 110 is compressed as the clamping ring 32 is pressed against the flange 30 by tightening the bolts 34. It has been found that at least three bolts 34 (for example, the smallest metric bolt that can be used is M3) are needed to properly compress the sealing ring 110. The following table lists exemplary torque values for sealing rings 110 having a specified diameter (indicated by reference 301 in FIG. 3(a)) that can be applied to each metric bolt to adequately compress the sealing ring 110 against the clamping ring 32.

TABLE

| Diameter (mm) | Maximum Torque (Newton Meters) |
| --- | --- |
| 2 | 0.37 |
| 3 | 1.34 |
| 4 | 3.04 |
| 5 | 6.03 |
| 6 | 10.3 |
| 8 | 25.5 |
| 10 | 50.01 |
| 12 | 87.28 |
| 16 | 210.8 |
| 20 | 411.9 |
| 24 | 711 |
| 30 | 1422 |
| 36 | 2481 |
| 42 | 3991 |

Figure 3B:
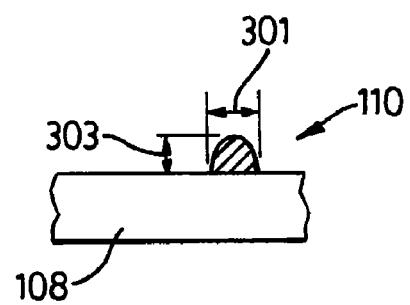
FIG. 3(b) shows a partial cross sectional view of the sealing ring.

The sealing ring 110 is also defined by a height or radial bump 303 as shown in the partial cross sectional view in FIG. 3(b). The height 303 of the sealing ring 110 may be any suitable height which allows the sealing ring 110 to be compressed when the clamping ring 32 is tightened by the bolts 34.

Forming the sealing ring 110 as an integral component of the antenna assembly 106 gives rise to a number of benefits. First, the arrangement facilitates manufacture and assembly. Secondly, the sealing ring 110 formed of PTFE provides a better operating temperature range and characteristics than conventional rubber o-rings. Thirdly, the PTFE sealing ring 110 provides better transmission properties for microwave or radar pulses than conventional rubber o-rings.

Figure 4:
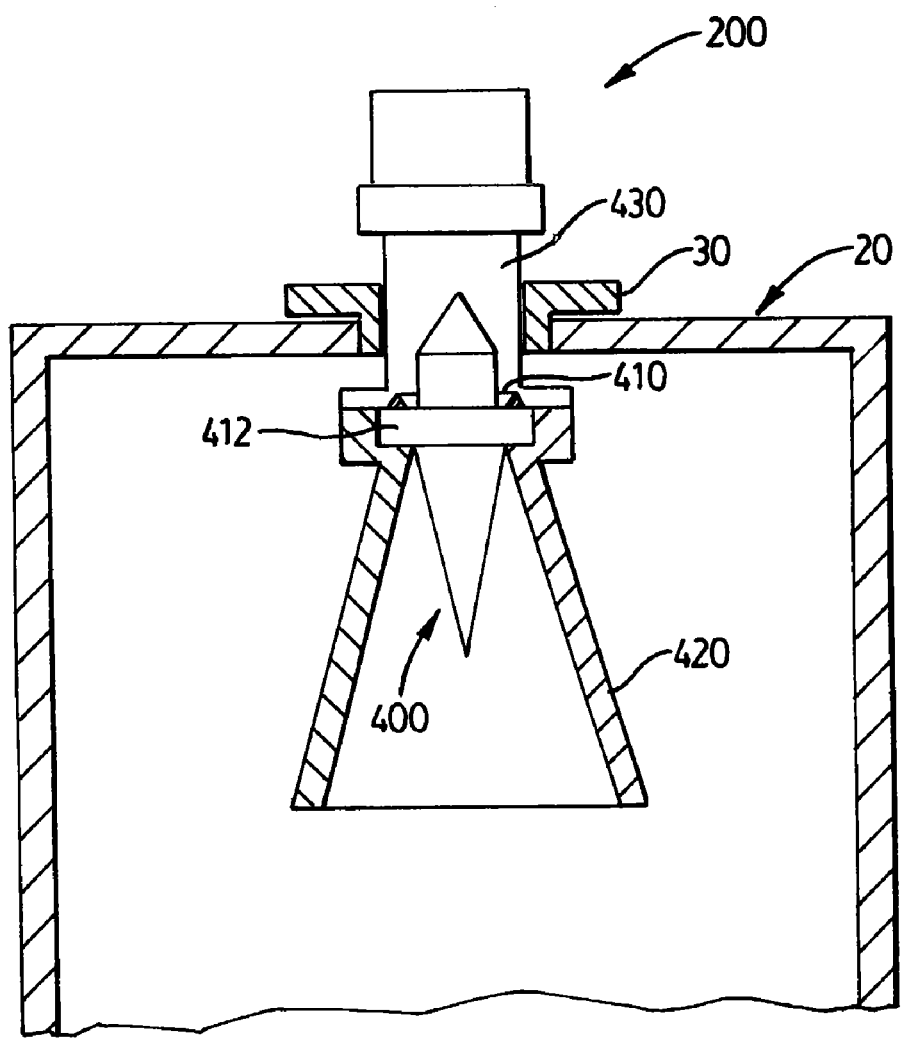
FIG. 4 shows an antenna structure for a radar-based level measurement system comprising a horn antenna arrangement according to another embodiment of the present invention.

Reference is next made to FIG. 4, which shows an antenna assembly 400 for a horn antenna 420 according to another embodiment of the invention. The horn antenna 420 is coupled to a level measurement device 200 and operated in known manner. The antenna assembly 400 comprises a sealing ring or member 410 as described above. The sealing ring 410 is formed as an integral component on a section 412 of the antenna assembly 400 in a manner similar to that described above. The sealing ring or member 410 forms an integrated component of the zone barrier (e.g. between the level measurement circuitry and the vessel) and the electromagnetic energy transfer window. The antenna assembly 400 does not need to be located or placed at the flange 30, and may be placed in other positions within the waveguide, indicated generally by reference 430.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather the foregoing description, and all changes which come within the meaning and range of equivalency of the claims are therefore intended to be embraced therein.

What is claimed is:

1. A level measurement apparatus comprising:
an antenna assembly for emitting electromagnetic energy and for coupling reflected electromagnetic energy, said reflected electromagnetic energy reflected by a material held in a container;
a controller having:
a receiver module for converting said reflected electromagnetic energy into corresponding electrical signals;
a transmitter module; and
a program component for determining the distance traveled by the reflected electromagnetic energy;
where said antenna assembly is operatively coupled to said transmitter module such that, responsive to said transmitter module, said antenna assembly emits electromagnetic energy, and where said antenna assembly is operatively coupled to said receiver module for outputting, to said receiver module, said reflected electromagnetic energy; and
said antenna assembly having a mounting member formed from a material conductive of said electromagnetic energy;
said antenna assembly including a sealing ring, said sealing ring being formed from said material conductive of said electromagnetic energy;
said antenna assembly further including a clamping member for coupling said container to said mounting member, said clamping member positioned so that, in response to a force being applied to said clamping member said sealing ring is compressed, thereby forming a seal between the interior of said container and said controller.

2. The level measurement apparatus as claimed in claim 1, wherein said sealing ring is molded as an integral component with said mounting member from a polymer material.

3. The level measurement apparatus as claimed in claim 1, wherein said sealing ring and said mounting member comprise individual components formed from a polymer material, said sealing ring being affixed to a surface of said mounting member.

4. A radar-based level measurement apparatus for determining the level of a material contained in a container, said apparatus comprising:
  transducer means having means for emitting radar pulses and means for coupling radar pulses reflected from the surface of the material;
  controller means having means for receiving and means for transmitting;
  said transducer means having an antenna structure that is operatively coupled to said means for transmitting and is adapted to emit the radar pulses, and said antenna structure is also operatively coupled to said means for receiving and is adapted to output, to said means for receiving, the reflected radar pulses;
  said means for receiving adapted to convert the reflected radar pulses into corresponding electrical signals, and said controller means including means for determining the distance traveled by said radar pulses; and
  said antenna structure including a means for mounting said antenna structure to said container, said means for mounting including a sealing means, said sealing means and said means for mounting being formed from the same material, said material for conducting said electromagnetic energy.

5. The radar-based level measurement apparatus as claimed in claim 4, wherein said sealing means comprises a ring arrangement, said ring arrangement being molded as an integral component with said means for mounting.

6. The level measurement apparatus as claimed in claim 4, wherein said sealing means comprises a ring, and said means for mounting and said ring being formed from a polymer material, said ring being affixed to a surface of said means for mounting.

7. An antenna structure for use with level measurement apparatus for measuring the level of a material held in a container, said antenna structure comprises:
  an upper section formed from a material having properties for conducting energy pulses, said upper section being coupled to the level measurement apparatus, and said upper section including a mounting member and a sealing ring, said sealing ring being formed from the same material as said upper section and said sealing ring being situated on a surface of said mounting member;
  a lower section formed from the same material, and having an integral antenna, said antenna being responsive to the level measurement apparatus for emitting electromagnetic energy pulses and receiving electromagnetic energy pulses reflected by the material held in the container;
wherein said sealing ring becomes a compressed sealing ring in response to a tightening force being applied to a clamping member, said clamping member being coupled to said mounting member to couple the antenna structure to the level measurement apparatus and said compressed sealing ring providing a seal between the clamping member and said mounting member.

8. The antenna structure as claimed in claim 7, wherein said sealing ring is molded as an integral component with said mounting member from a polymer material.

9. The antenna structure as claimed in claim 7, wherein said sealing ring and said mounting member comprise individual components formed from a polymer material, said sealing ring being welded to a surface of said mounting member.

10. A horn antenna assembly for a level measurement apparatus for measuring the level of a material held in a container, said horn antenna assembly comprises:
  a horn antenna; and
  an antenna structure coupled to said horn antenna;
  said antenna structure having an upper section formed from a material having properties for conducting energy pulses;
  said upper section including a mounting member and a sealing ring, said sealing ring being formed from the same material as said upper section and said sealing ring being situated on a surface of said mounting member;
  said antenna structure having a lower section formed from the same material as said upper section;
  said antenna structure and said horn antenna:
    being responsive to the level measurement apparatus for emitting electromagnetic energy pulses; and
    receiving electromagnetic energy pulses reflected by the material held in the container;
wherein said sealing ring becomes a compressed sealing ring in response to a tightening force being applied to said mounting member to couple the antenna structure to the horn antenna and said compressed sealing ring provides a seal between the level measurement apparatus and said lower section extending into the horn antenna.

11. The horn antenna assembly as claimed in claim 10, wherein said sealing ring is molded as an integral component with said mounting member from a polymer material.

12. The horn antenna assembly as claimed in claim 10, wherein said sealing ring and said mounting member comprise individual components formed from a polymer material, said sealing ring being welded to a surface of said mounting member.

13. A level measurement apparatus comprising:
  an antenna assembly having a mounting member formed from a dielectric material and a seal formed from said dielectric material, said seal positioned to interpose a surface of said mounting member and a surface of an apparatus to which said antenna assembly is to be mounted;
  a transmitter module operable to generate outbound electromagnetic energy for emission by said antenna assembly;
  a receiver module operable to receive inbound electromagnetic energy from said antenna assembly and convert said inbound electromagnetic energy to corresponding electrical signals, where said inbound electromagnetic energy includes a portion of said outbound electromagnetic energy reflected by a material held in a container; and
  a controller in communication with said transmitter module and said receiver module, said controller operable to determine, based on input from said receiver module, a distance traveled by said inbound electromagnetic energy.

* * * * *